(12) United States Patent
Abdel-Rahman et al.

(10) Patent No.: US 9,472,028 B2
(45) Date of Patent: Oct. 18, 2016

(54) AUGMENTED REALITY BASED INTERACTIVE TROUBLESHOOTING AND DIAGNOSTICS FOR A VEHICLE

(71) Applicant: GM GLOBAL TECHNOLOGY OPERATIONS LLC, Detroit, MI (US)

(72) Inventors: Akram M. Abdel-Rahman, Whitby (CA); Neeraj R. Gautama, Whitby (CA); Donald Eng, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 144 days.

(21) Appl. No.: 14/311,529

(22) Filed: Jun. 23, 2014

(65) Prior Publication Data

US 2015/0371455 A1 Dec. 24, 2015

(51) Int. Cl.
*G06F 7/00* (2006.01)
*G07C 5/00* (2006.01)
*G06T 11/60* (2006.01)
*G06F 17/30* (2006.01)

(52) U.S. Cl.
CPC ......... *G07C 5/008* (2013.01); *G06F 17/30864* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 2014/0281957 A1* | 9/2014 | Weng | ..................... | G06F 1/1626 715/702 |
| 2014/0310788 A1* | 10/2014 | Ricci | ..................... | H04W 48/04 726/6 |
| 2015/0061895 A1* | 3/2015 | Ricci | ..................... | H04W 4/22 340/902 |
| 2015/0232065 A1* | 8/2015 | Ricci | ..................... | B60R 25/01 701/36 |
| 2015/0302667 A1* | 10/2015 | Punjabi | ................... | G07C 5/008 701/31.4 |
| 2015/0356795 A1* | 12/2015 | Warren | ................... | G07C 5/008 701/31.5 |

OTHER PUBLICATIONS http://www.bmw.com/com/en/owners/service/augmented_reality_workshop_1.html, retrieved from the Internet on Jun. 20, 2014.
Okulski, Travis, Augmented Reality App Will Help VW Techs Fix Your Car Correctly, [retrieved Jun. 20, 2014]. Retrieved from the Internet from http://jalopnik.com/augmented-reality-app-will-help-vw-techs-fix-your-car-c-1435794037.

* cited by examiner

*Primary Examiner* — Adam Alharbi
(74) *Attorney, Agent, or Firm* — Lorenz & Kopf, LLP

(57) ABSTRACT

An augmented reality based interactive troubleshooting and diagnostic system and related operating methods are presented here, including a diagnostic communication method for a vehicle having an onboard diagnostics subsystem. An exemplary embodiment of the method uses a mobile user device to obtain self-diagnostic information generated by the onboard diagnostics subsystem. The method continues by sending a query to a solution database system, wherein the query includes the obtained self-diagnostic information and vehicle configuration data descriptive of the vehicle. The mobile user device receives solution data provided by the solution database system in response to the query. The solution data addresses at least one topic associated with the obtained self-diagnostic information. The method continues by operating the camera and the display element in response to the received solution data to perform an augmented reality procedure associated with the at least one topic.

20 Claims, 6 Drawing Sheets

AUGMENTED REALITY BASED INTERACTIVE TROUBLESHOOTING AND DIAGNOSTICS FOR A VEHICLE

TECHNICAL FIELD

Embodiments of the subject matter described herein relate generally to systems and methodologies for maintaining vehicles. More particularly, embodiments of the subject matter relate to an augmented reality technique that uses interactive communication to support vehicle troubleshooting, diagnostics, repair, and/or maintenance.

BACKGROUND

The prior art includes a variety of electronic and computer-based tools for vehicle maintenance, diagnosis, repair, and inspection. These tools allow service technicians (and, to some extent, owners) to efficiently and more effectively troubleshoot, maintain, and repair vehicles. In this regard, virtual reality and augmented reality applications have been developed for use with servicing and maintaining vehicles. An augmented reality application uses a forward facing camera and a display element of a portable or mobile electronic device (e.g., a smartphone or a tablet computer), and provides information to the user that enhances or otherwise supplements the image or video content rendered on the display. The supplemental information provided by the augmented reality application may be text data, image data, video data, graphical indicators, and/or audio information that relates to a part, component, or repair procedure that involves the vehicle.

Conventional augmented reality applications that are used for vehicle maintenance, however, suffer from various shortcomings. For example, conventional augmented reality applications that are designed for vehicle maintenance assume that the user has already determined or chosen a task or a procedure to be performed. Thereafter, the augmented reality application serves as an enhanced "how to" that provides instructions to the user. Unfortunately, conventional augmented reality applications designed for vehicle maintenance do not assist in the diagnosis or troubleshooting of problems onboard the vehicle, nor do they provide guidance or recommendations related to vehicle diagnosis.

Accordingly, it is desirable to have a system and methodology for diagnosing and maintaining a vehicle using augmented reality technology. In addition, it is desirable to have methodology that supports active diagnostic communication between a mobile user device, one or more subsystems onboard a vehicle, and a solutions database system for purposes of supporting augmented reality based procedures that relate to the vehicle. Furthermore, other desirable features and characteristics will become apparent from the subsequent detailed description and the appended claims, taken in conjunction with the accompanying drawings and the foregoing technical field and background.

BRIEF SUMMARY

A diagnostic communication method for a vehicle having an onboard diagnostics subsystem is presented here. An exemplary embodiment of the method begins by obtaining, with a mobile user device having a camera and a display element, self-diagnostic information generated by the onboard diagnostics subsystem. The method continues by sending a query to a solution database system, the query including the obtained self-diagnostic information and vehicle configuration data descriptive of the vehicle. Solution data is at the mobile user device, the solution data provided by the solution database system in response to the query, and the solution data addressing at least one topic associated with the obtained self-diagnostic information. The method continues by operating the camera and the display element in response to the received solution data to perform an augmented reality procedure associated with the at least one topic.

Also provided here is a computer readable storage media having executable instructions capable of performing a method that involves: obtaining self-diagnostic information generated by an onboard diagnostics subsystem of a vehicle; sending a query to a solution database system, the query including the obtained self-diagnostic information and vehicle configuration data descriptive of the vehicle; receiving solution data, the solution data provided by the solution database system in response to the query, and the solution data addressing at least one topic associated with the obtained self-diagnostic information; and operating a camera and a display element of a mobile user device in response to the received solution data to perform an augmented reality procedure associated with the at least one topic.

A diagnostic communication method for a vehicle having an onboard diagnostics subsystem is also presented here. An exemplary embodiment of the method obtains, with a mobile user device having a camera and a display element, self-diagnostic information generated by the onboard diagnostics subsystem and vehicle configuration data descriptive of the vehicle. The method continues by retrieving initial solution data based on the obtained self-diagnostic information and the obtained vehicle configuration data, the solution data addressing at least one topic associated with the obtained diagnostic information. The method continues by operating the camera and the display element in response to the retrieved initial solution data to perform an initial augmented reality procedure associated with the at least one topic.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. Moreover, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in any processor-readable medium, which may be realized in a tangible form. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

System and Operational Overview

Figure 1:
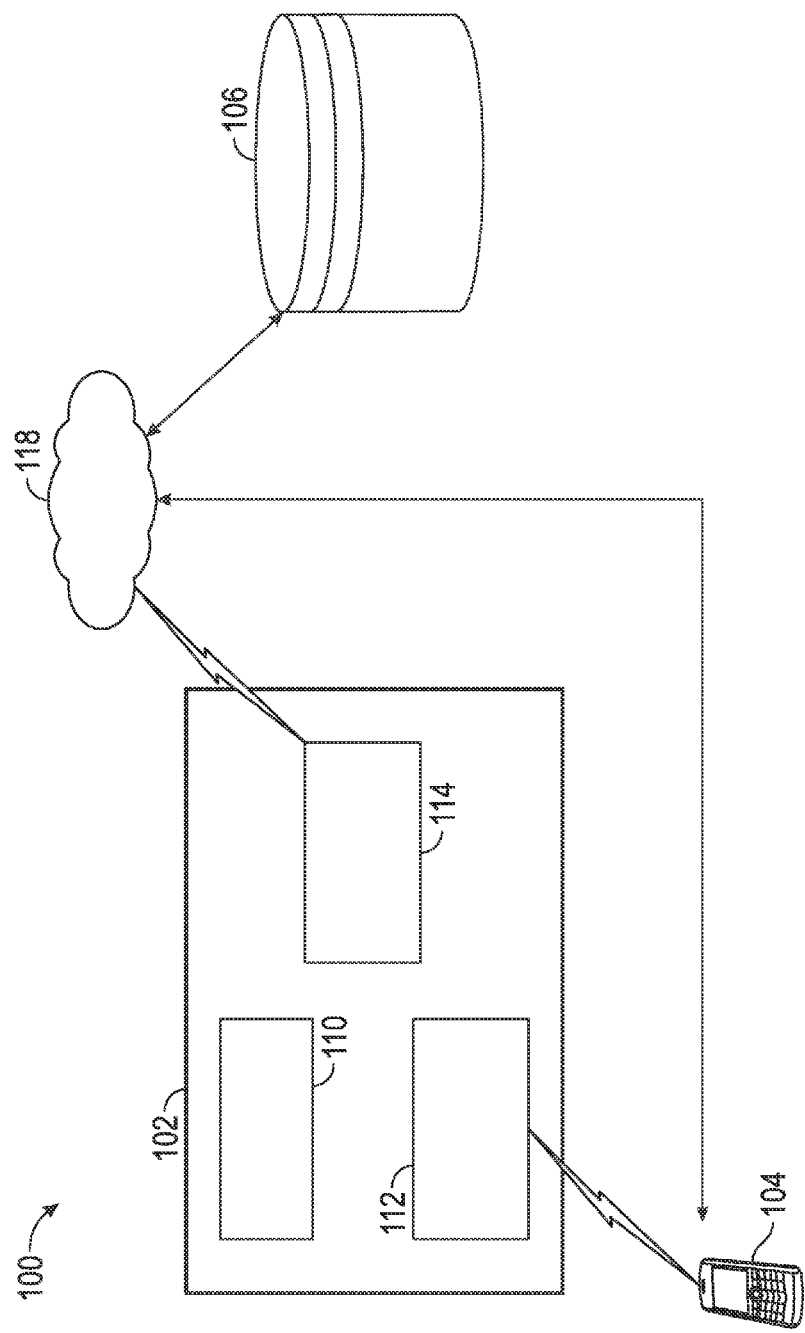
FIG. 1 is a schematic representation of an exemplary embodiment of a system that supports augmented reality methodologies.

FIG. 1 is a schematic representation of an exemplary embodiment of a system 100 that supports augmented reality methodologies to assist in the diagnosis, maintenance, operation, and/or repair of a vehicle 102. The supported augmented reality methodologies could also be used for other purposes related to the use, ownership, or functionality of the vehicle 102, depending on the particular embodiment and desired application of the system 100. The illustrated embodiment of the system 100 generally includes, without limitation: the vehicle 102; a mobile user device 104; and a solution database system 106.

In certain embodiments, the vehicle 102 is an automobile. Alternatively, the vehicle 102 may be, without limitation: a motorcycle; a scooter; a watercraft; a train or other form of mass transit vehicle; an aircraft; a spacecraft; etc. As is well understood, the vehicle 102 includes a number of conventional subsystems, components, and assemblies that cooperate to support the various operating features and functions of the vehicle 102 (these conventional aspects of the vehicle 102 will not be described in detail here). The vehicle 102 may also include, without limitation: an onboard diagnostics subsystem 110; a local communication subsystem 112; and a network communication subsystem 114.

The onboard diagnostics subsystem 110 is suitably configured to perform various tests, checks, and/or maintenance procedures on subsystems, components, applications, and/or functions utilized by the vehicle 102. The onboard diagnostics subsystem 110 generates self-diagnostic information that indicates or otherwise reports the results of the tests, checks, procedures, etc. In certain embodiments, the self-diagnostic information includes diagnostic trouble codes (DTCs) that indicate problematic subsystems or components onboard the vehicle 102. DTCs can be analyzed by a computer-based system or by a service technician to determine how best to maintain or repair the vehicle 102, as needed.

The local communication subsystem 112 supports local data communication between the vehicle 102 and devices or components operating in close proximity to the vehicle 102, such as the mobile user device 104. The local communication subsystem 112 supports wireless data communication in accordance with one or more wireless protocols. For example, the local communication subsystem 112 may support wireless local area network (WLAN) data communication, BLUETOOTH wireless communication, or the like. In addition, the local communication subsystem 112 may support data communication over a cable or other tangible connection. For example, the local communication subsystem 112 may support wired data communication using, for example, a USB cable, an assembly line diagnostic link (ALDL) port, or the like. It should be appreciated that the local communication subsystem 112 may support any conventional or proprietary data communication technique that is also supported by the mobile user device 104.

The network communication subsystem 114 supports data communication between the vehicle 102 and at least one data communication network 118. In certain preferred embodiments, the network communication subsystem 114 supports wireless data communication with the network 118. In this regard, the network communication subsystem 114 may be suitably configured to support, without limitation: a cellular communication protocol; a satellite communication protocol; microwave communication technologies; or the like. In addition, the network communication subsystem 114 may support data communication over a cable or other tangible connection, e.g., an Ethernet cable or a USB cable. It should be appreciated that the network communication subsystem 114 may support any conventional or proprietary data communication technique that enables the vehicle 102 to communicate with the network 118.

The mobile user device 104 is capable of communicating with the vehicle 102 (by way of the local communication subsystem 112 or otherwise). In addition, the mobile user device 104 may be capable of communicating with the network 118 using any appropriate data communication technology, which may be wireless or via a tangible cable or connection. The mobile user device 104 may be realized in the form of a mobile telephone, a personal digital assistant, a mobile computer device (e.g., a laptop computer, a netbook computer, a tablet computer, a near-to-eye display device, or a handheld computer), a digital media player, a portable video game device, or the like. The non-limiting example described here assumes that the mobile user device 104 is a smartphone device.

The network 118 accommodates data communication to and from the vehicle 102 (by way of the network communication subsystem 114 or otherwise). Moreover, in certain embodiments the network 118 accommodates data communication to and from network-based or cloud-based components of the system 100. For example, the network 118 may accommodate communication to and from a remote cloud-based solution database system 106 as depicted in FIG. 1. The network 118 may include or cooperate with one or more network communication technologies, protocols, standards, and specifications. In this regard, the network 118 may include or cooperate with one or more of the following, without limitation: the Internet; a cellular telecommunication network (e.g., a 3G, 4G, UMTS, or other network); a satellite communication network; the Public Switched Telephone Network (PSTN); or the like. Network architectures and related data communication protocols and techniques are well known, and conventional aspects of the network 118 will not be described in detail here.

The system 100 may include or cooperate with at least one solution database system 106, which manages and maintains solution data used by the system 100. In accordance with some implementations, a solution database system 106 may be deployed in conjunction with a cloud-based telematics system that supports a plurality of different vehicles. For example, the solution database system 106 may be deployed and maintained in connection with a service such as the ONSTAR vehicle support system. Although FIG. 1 depicts a remotely located (relative to both the vehicle 102 and the mobile user device 104) network-based solution database system 106, alternative embodiments may include an onboard solution database system that is resident at the vehicle 102. Other embodiments may include a locally maintained solution database system that is resident at the mobile user device 104. In practice, the system 100 may include or cooperate with multiple solution database systems, which may be cloud-based (as depicted in FIG. 1), local to the vehicle 102, local to the mobile user device 104, and/or resident at a device or component that can be communicatively coupled to an onboard communication subsystem of the vehicle 102 or communicatively coupled to the mobile user device 104 as needed (for example, an external computing device).

The solution database system 106 may include, without limitation: solution data that is responsive to or otherwise addresses topics and subject matter associated with self-diagnostic information obtained by the onboard diagnostics subsystem 110; solution data that relates to captured image or video content; solution data that is responsive to requests for information or documentation; or the like. In this regard, the solution database system 106 may store information related to DTCs that might be generated by the onboard diagnostics subsystem 110. Alternatively or additionally, the solution database system 106 may store information that can be used during augmented reality procedures (e.g., tutorials) for vehicle troubleshooting, problem diagnosis, repairs, or the like. Alternatively or additionally, the solution database system 106 may include information that can be used during augmented reality procedures that demonstrate or document certain features of the vehicle 102.

Notably, the content of a remote network-based solution database system 106 can be updated in an ongoing manner based on feedback from end users. Thus, the system 100 can attempt to optimize and improve the solution data based on historical results, the experiences of the end users, and the like. Moreover, a network-based solution database system 106 can be updated as needed to support new vehicle makes and models, new components or parts, and/or newly discovered problems or diagnostic techniques. The dynamic nature of the solution database system 106 is desirable to increase the likelihood that the associated augmented reality procedures are on point, effective, and correct.

Figure 2:
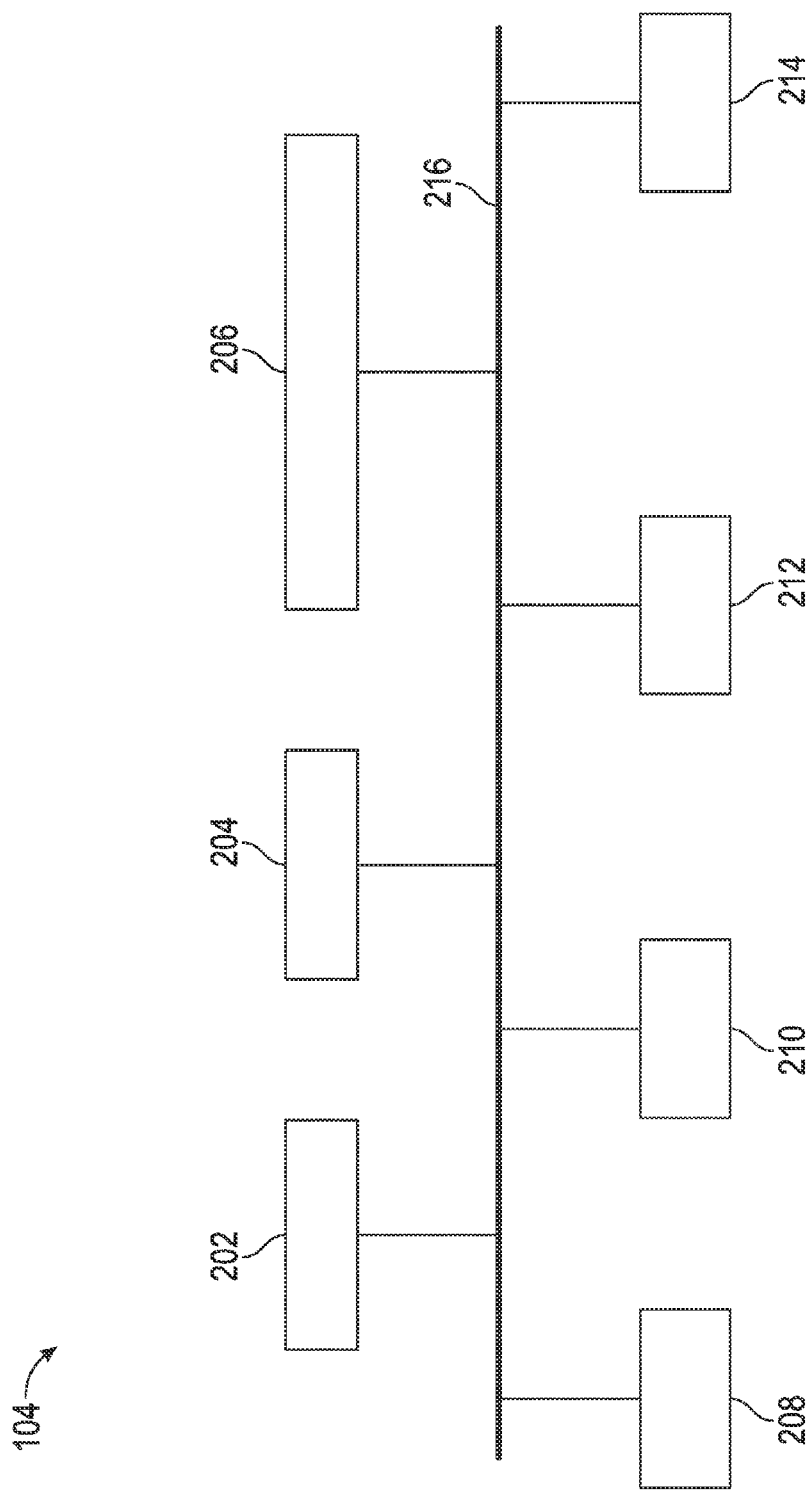
FIG. 2 is a schematic representation of an exemplary embodiment of a mobile user device suitable for use in the system shown in FIG. 1.

FIG. 2 is a schematic representation of an exemplary embodiment of the mobile user device 104. The illustrated embodiment of the mobile user device includes, without limitation: at least one processor 202; a suitable amount of memory 204; computer readable storage media 206; a camera 208; a display element 210; a user interface 212; and a communication module 214. Some or all of these elements may be coupled together with any suitable interconnection architecture 216. An exemplary embodiment of the mobile user device 104 may include additional elements, components, features, and/or functionality associated with conventional operating aspects, and such conventional aspects will not be described in detail herein.

In certain implementations, the processor 202 may be realized with any number of hardware, software, and/or firmware components, and it may include any number of logical or functional modules. The processor 202 may be implemented with a general purpose microprocessor, a content addressable memory, a digital signal processor, an application specific integrated circuit, a state machine, a field programmable gate array, any suitable programmable logic device, discrete gate or transistor logic, discrete hardware components, or any combination designed to perform the functions described here. Moreover, the processor 202 may be implemented as a combination of computing devices, e.g., a combination of a digital signal processor and a microprocessor, a plurality of microprocessors, one or more microprocessors in conjunction with a digital signal processor core, or any other such configuration.

The memory 204 may be realized as RAM memory, flash memory, EPROM memory, EEPROM memory, registers, a hard disk, a removable disk, a CD-ROM, or any other form of storage medium known in the art. In this regard, the memory 204 can be coupled to the processor 202 such that the processor 202 can read information from, and write information to, the memory 204. In the alternative, the memory 204 may be integral to the processor 202. As an example, the processor 202 and the memory 204 may reside in an ASIC.

Although depicted separately, the computer readable storage media 206 may be realized using a portion of the memory 204. The computer readable storage media 206 may be non-transitory and tangible media that is used to store executable instructions capable of performing the various processes and methods described in more detail below. In this regard, the computer readable storage media 206 may include one or more software programs or applications that include executable instructions that, when executed at the mobile user device 104, carry out the desired vehicle maintenance, diagnosis, and associated augmented reality procedures described here.

The camera 208 is configured to capture images (still and/or video images) in accordance with well-established digital imaging technologies. For reasons that will become apparent from the following description, the camera 208 is either a forward facing camera or is designed such that it can function as a forward facing camera in at least one operating mode. Accordingly, images obtained by the forward facing camera 208 can be rendered on the display element 210 in real time. In certain embodiments, both the camera 208 and the display element 210 are integrated elements of the mobile user device 104. Moreover, the display element 210 may be realized as a touch-sensitive element that can be manipulated by the user as an input device. As explained in more detail below, the camera 208 and the display element 210 cooperate to support augmented reality procedures related to the vehicle 102.

The user interface 212 may include, without limitation: a keypad; one or more navigation buttons; a microphone; a speaker; a touchpad; a joystick or other cursor pointing mechanism; or the like. The user interface 212 enables the user to manipulate applications and features supported by the mobile user device 104.

The communication module 214 may represent processing logic, hardware, software, and/or firmware that is suitably configured to support wireless and/or non-wireless communication protocols, schemes, and techniques utilized by the mobile user device 104. As explained in the context of FIG. 1, the communication module 214 may support any number of suitable wireless data communication protocols, techniques, or methodologies, including, without limitation: BLUETOOTH; ZigBee (and other variants of the IEEE 802.15 protocol); IEEE 802.11 (any variation); IEEE 802.16 (WiMAX or any other variation); wireless home network communication protocols; and proprietary wireless data communication protocols such as variants of Wireless USB. In certain embodiments, the communication module 214 supports non-wireless data communication, e.g., Ethernet, USB, or the like.

Figure 3:
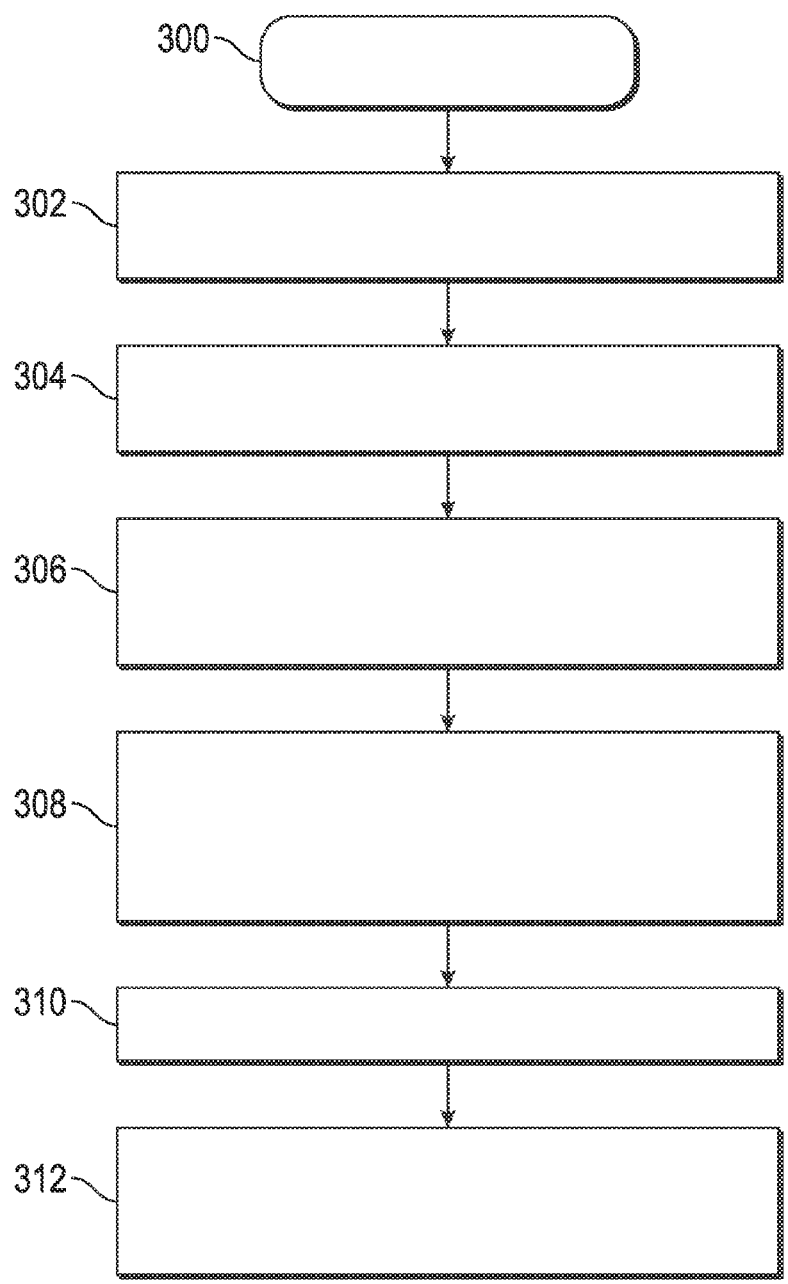
FIG. 3 is a flow chart that illustrates an exemplary embodiment of an active diagnostic communication process.

The computer readable storage media 206 of the mobile user device 104 may be used to store executable instructions for a vehicle-based augmented reality application. In this regard, the mobile user device 104 may cooperate with the onboard diagnostics subsystem 110 and the solution database system 106 to provide certain augmented reality features related to the maintenance, diagnosis, support, operation, repair, and/or troubleshooting of the vehicle 102. To this end, FIG. 3 is a flow chart that illustrates an exemplary embodiment of an active diagnostic communication process 300, which may be performed by the system 100. It should be appreciated that the process 300 represents one feature that may be supported by a suitably written and executed application or program resident at the mobile user device 104. Of course, the mobile user device 104 may also support other diagnostic, augmented reality, and/or conventional functions and features.

The various tasks performed in connection with a process described here may be performed by software, hardware, firmware, or any combination thereof. For illustrative purposes, the following description of certain processes may refer to elements mentioned above in connection with FIG. 1 and FIG. 2. In practice, portions of a described process may be performed by different elements of the described system, e.g., the mobile user device, the onboard diagnostics subsystem, a communication module, or a solution database system. It should be appreciated that an embodiment of an illustrated process may include any number of additional or alternative tasks, the tasks shown in the figures need not be performed in the illustrated order, and a described process may be incorporated into a more comprehensive procedure or process having additional functionality not described in detail herein. Moreover, one or more of the tasks shown in a figure could be omitted from an embodiment of the illustrated process as long as the intended overall functionality remains intact.

The process 300 assumes that the mobile user device 104 obtains self-diagnostic information for the vehicle 102 (task 302). As explained above, the self-diagnostic information may be generated by the onboard diagnostics subsystem 110 and then communicated to the mobile user device 104 (directly or indirectly if so desired). In some embodiments, the mobile user device 104 may be configured to generate some or all of the self-diagnostic information based on image data captured by the camera 208, by a microphone, and/or by other sensors of the mobile user device 104. This example assumes that the self-diagnostic information includes at least one DTC that is indicative of a problem or some action item that needs to be addressed.

The process 300 may proceed by generating and sending a suitably formatted query to the solution database system 106 (task 304). The query may include, without limitation, the obtained self-diagnostic information along with vehicle configuration data that is descriptive of the vehicle 102. The vehicle configuration data may, for example, include data that indicates: the Vehicle Identification Number (VIN); the model year; an option package (if applicable); option codes; and the like. Depending upon the circumstances, the query may represent a request for a repair tutorial corresponding to the DTCs, a request for information related to a feature or function of the vehicle 102, a request for guidance in diagnosing a problem, etc.

In some scenarios, task 304 is performed by the mobile user device 104 such that the query is sent from the mobile user device 104 to the solution database system 106. In other situations, the query is sent from an onboard communication subsystem of the vehicle 102 to the solution database system 106. Regardless of the manner in which the query is communicated, the solution database system 106 receives and processes the query as needed to search for relevant solution data that may be useful to address the issue(s) identified by the query. This example assumes that at least some relevant solution data is retrieved by the solution database system, and that the solution data is communicated in a manner intended for the mobile user device 104. Accordingly, the mobile user device 104 receives the solution data in response to issuing the query (task 306). The solution data addresses at least one topic, issue, or item associated with the self-diagnostic information obtained at task 302. In certain situations, the solution data may relate to a plurality of different potential solutions, procedures, or action items, wherein the user is given the opportunity to select which solution (or solutions) to try first.

For this particular implementation, the solution data includes image data, text data, audio data, and/or other information that can be processed and rendered locally by the mobile user device 104 in connection with one or more augmented reality procedures associated with the topic, issue, or item of interest. Thus, the process 300 may continue by operating the camera 208 and the display element 210 in response to the received solution data to perform an augmented reality procedure intended to address the topic, issue, or item identified in the query (task 308). Augmented reality techniques and technologies are generally known. Briefly, augmented reality "is a live direct or indirect view of a physical real-world environment whose elements are augmented (or supplemented) by computer-generated sensor input such as sound, video, graphics or GPS data" (as defined by Wikipedia at the time of this writing). In this regard, the forward facing camera 208 of the mobile user device 104 captures real time image data of an object of interest (such as a component of the vehicle 102), and the display element 210 serves as a monitor for the user holding the mobile user device 104. The augmented reality procedure is associated with the rendering of additional information (audio, visual, and/or haptic feedback) in addition to the monitored image information.

Figure 4:
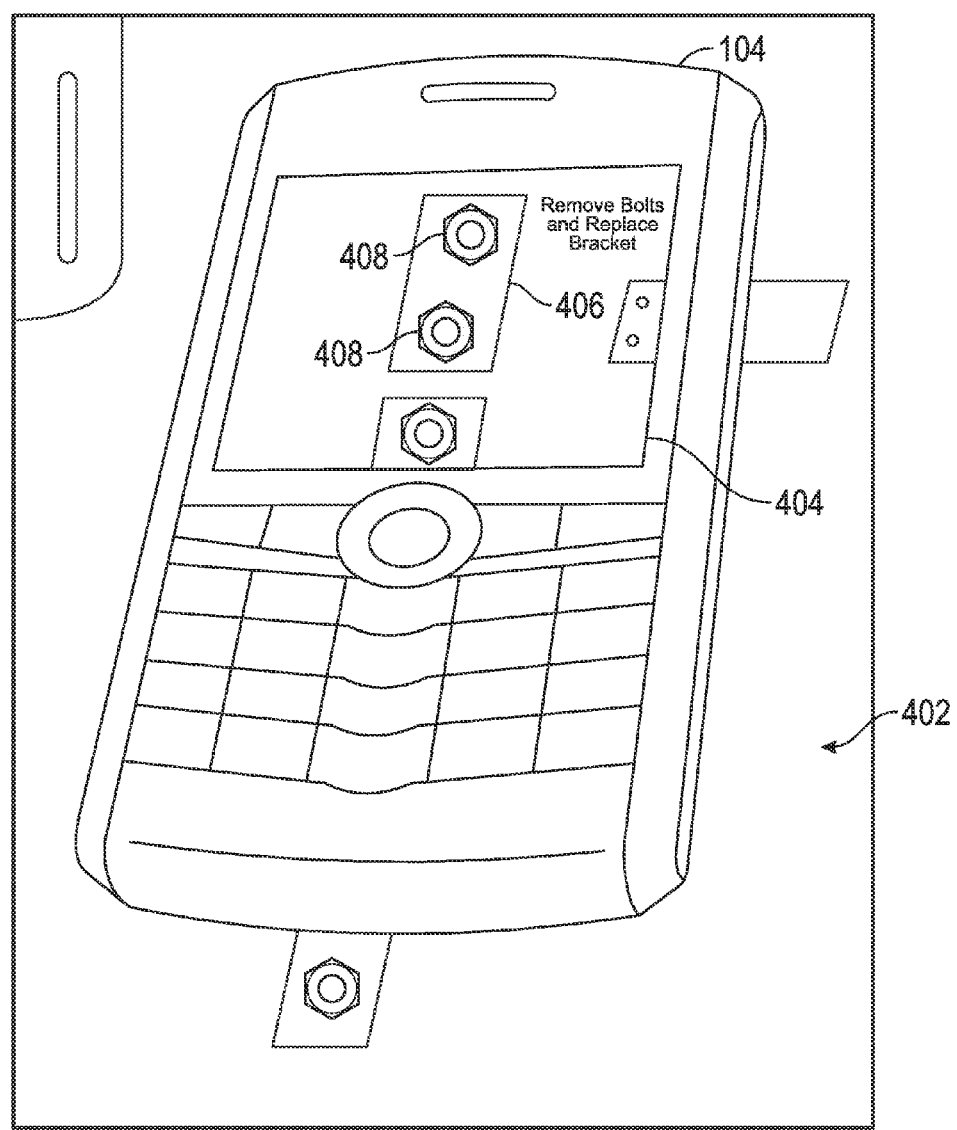
FIG. 4 is a diagram that shows a mobile user device operating in an augmented reality mode.

FIG. 4 is a diagram that shows an embodiment of the mobile user device 104 operating in an augmented reality mode. The mobile user device 104 is shown "hovering" over a section 402 of a vehicle. The display 404 of the mobile user device 104 is used to render the underlying section 402 in real time. This simplified example assumes that the augmented reality procedure relates to the removal of a bracket 406, which is fully visible in the display 404. The corresponding solution data identifies two bolts 408 by highlighting, coloring, outlining, or labeling. The solution data also includes an instruction 410, which is realized as graphical text in FIG. 4. Alternatively or additionally, the instruction 410 could be annunciated using a speaker of the mobile user device. For this example, the instruction 410 guides the user as follows: "Remove bolts and replace bracket." The augmented reality mode enables the user to quickly and easily locate the bolts to be removed, and the bracket to be replaced. It should be appreciated that FIG. 4 merely demonstrates one possible scenario. In practice, the augmented reality procedure may involve multiple steps, animated tutorials, additional graphics, image overlays, and the like. Those familiar with augmented reality technology will understand that the solution data may be suitably configured to support the desired augmentation and virtual content rendered in conjunction with the real time image data.

Referring back to FIG. 3, the process 300 accommodates a user feedback feature. Accordingly, the mobile user device 104 may be operated to acquire user feedback related to the quality, usefulness, helpfulness, accuracy, applicability, correctness, etc., of the augmented reality procedure (task 310). The feedback may be obtained via the user interface 212 of the mobile user device 104, and the feedback may be formatted in any desired manner. For example, the feedback may be associated with a grade or a score that indicates the quality of the augmented reality procedure. In this regard, the process 300 may generate a screen with user-selectable radio buttons, a slider element, a text entry field, or the like. The obtained feedback may be communicated from the mobile user device 104 to the solution database system 106 for use in updating, enhancing, optimizing, or otherwise improving the content of the solution database system 106 (task 312). Such feedback can be utilized to improve the solution data and recommendations provided by the solution database system in an ongoing manner. Notably, feedback obtained from multiple users (and for different vehicles) can be managed and processed by a cloud-based system, which can be scaled as needed to increase capacity or processing power.

In accordance with some embodiments, task 310 may obtain user feedback in the form of a user request to retrieve additional solution data, a user request for different repair tutorials, or the like. In this context, the solution data received at task 306 may be considered to be "initial solution data" that is based on the self-diagnostic information (which may be generated by the onboard diagnostics subsystem 110 and/or by an application executing on the mobile user device 104), and the user feedback may be needed if the initial solution data is inapplicable, inaccurate, or incomplete.

Figure 5:
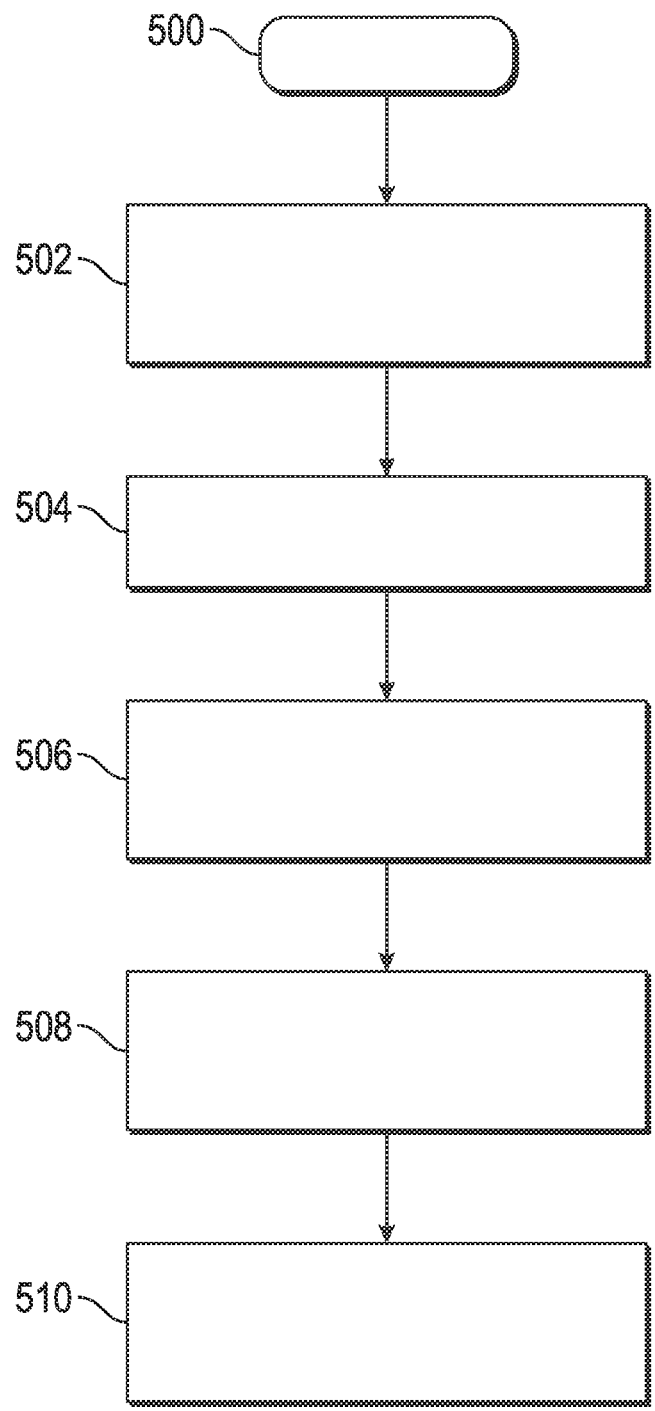
FIG. 5 is a flow chart that illustrates an exemplary embodiment of an initialization process that may be performed in conjunction with a vehicle-based active diagnostic communication process.

As mentioned above, the process 300 obtains the self-diagnostic information of the vehicle, and uses the self-diagnostic information to retrieve corresponding solution data that is somehow related to the self-diagnosis. The process 300 may be initiated in a variety of ways. In this regard, FIG. 5 is a flow chart that illustrates an exemplary embodiment of an initialization process 500 that may be performed in conjunction with a vehicle-based active diagnostic communication process. The process 500 may begin by establishing a data communication link or session between the mobile user device 104 and the vehicle 102 (task 502). Task 502 may be performed automatically when the mobile user device 104 is within wireless data communication range of an onboard communication module, such as the local communication subsystem 112 (see FIG. 1). Alternatively, task 502 may be performed when the mobile user device 104 is physically connected to an onboard communication module via a tangible cable or connector.

This description assumes that a data communication link has been properly established between the vehicle 102 and the mobile user device 104. The process 500 may continue by triggering or starting the onboard self-diagnosis procedure (task 504). Task 504 may be performed automatically when an appropriate data communication link is established, or in response to a user-entered command or instruction (e.g., activation of a button or a touchscreen element rendered by the application running on the mobile user device 104). For example, after establishing the data communication session, the application on the mobile user device 104 may generate a message such as "Start" or "Initiate Vehicle Diagnostics" or "Obtain DTCs Now". Alternatively or additionally, the task 504 may be performed by the onboard diagnostics subsystem 110 of the vehicle 102 in response to establishing the data communication link with the mobile user device 104.

Regardless of the manner in which the self-diagnosis is initiated, the process 500 continues by performing the self-diagnosis of the vehicle 102 to obtain the corresponding self-diagnostic information (task 506). As explained above, task 506 is performed by the onboard diagnostics subsystem 110 of the vehicle 102. Upon completion of the self-diagnosis (or, in some embodiments, during the self-diagnosis), the resulting self-diagnostic information can be provided to the mobile user device 104 (task 508). In certain preferred embodiments, the self-diagnostic information is communicated from the vehicle 102 to the mobile user device 104 using the data communication link established at task 502. In some embodiments, the self-diagnostic information may be communicated to the mobile user device 104 in an indirect manner using, for example, the network 118 and a different data communication link such as a cellular system or satellite system link. Moreover, some or all of the self-diagnostic information may be communicated from an onboard communication subsystem of the vehicle 102 to the solution database system 106, for purposes of archiving, updating or maintaining the content of the solution database system 106.

The process 500 may also provide vehicle configuration data to the mobile user device 104 (task 510). In certain embodiments, the vehicle configuration data is communicated from the vehicle 102 to the mobile user device 104 using the data communication link established at task 502. It should be appreciated that the application resident at the mobile user device 104 could store some or all of the vehicle configuration data for future use or reference. Consequently, task 510 need not be performed during future iterations of the process 500 that involve the same vehicle 102. In some embodiments, the vehicle configuration data may be communicated to the mobile user device 104 in an indirect manner using, for example, the network 118 and a different data communication link such as a cellular system or satellite system link. Moreover, some or all of the vehicle configuration data may be communicated from an onboard communication subsystem of the vehicle 102 to the solution database system 106, for purposes of archiving, updating or maintaining the content of the solution database system 106.

Figure 6:
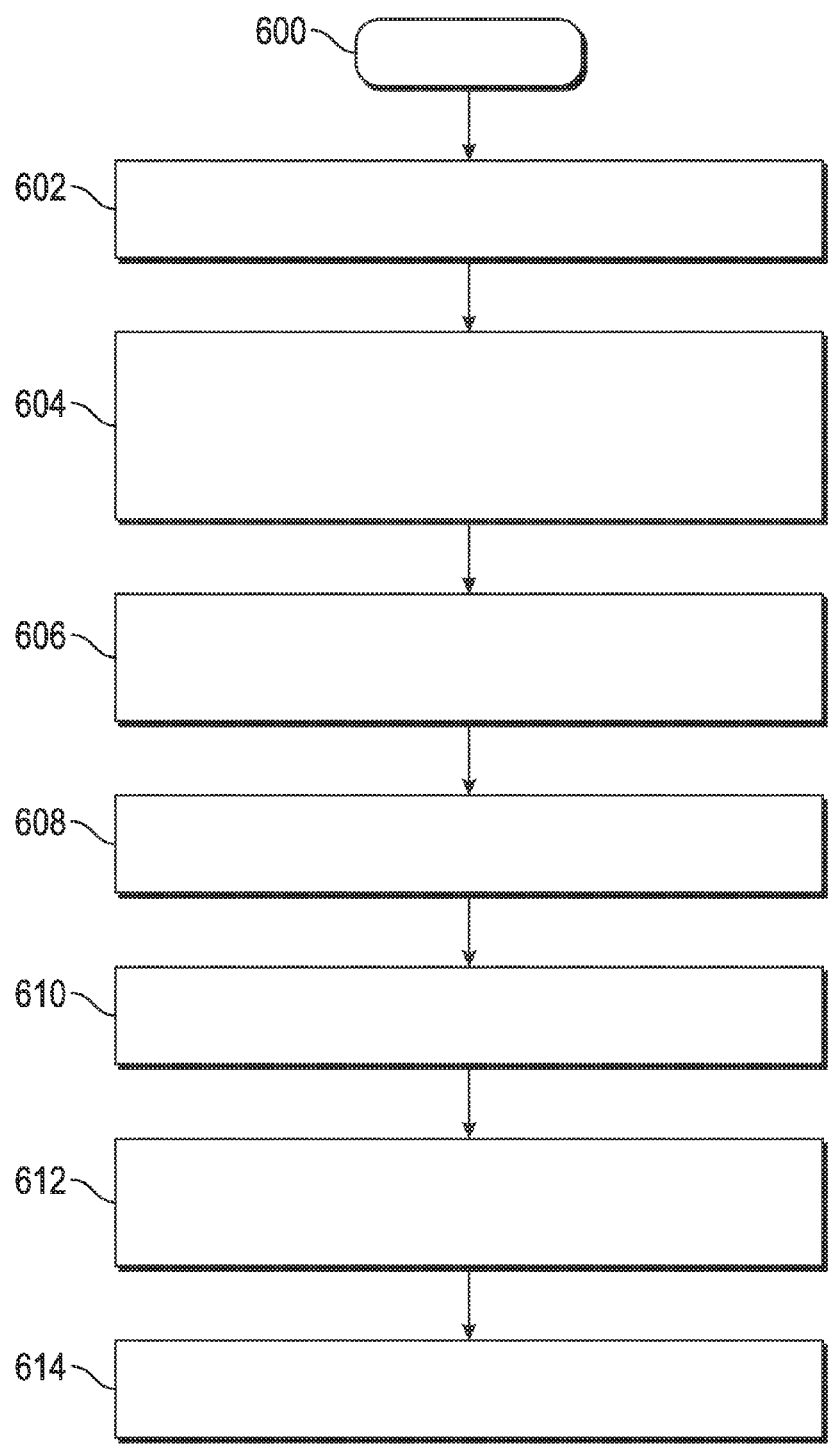
FIG. 6 is a flow chart that illustrates another exemplary embodiment of an initialization process that may be performed in conjunction with a vehicle-based active diagnostic communication process.

Although not depicted in FIG. 5, the initialization process 500 may lead to the process 300, which was described above. It should be understood that the process 500 represents only one possible methodology for initiating a vehicle-based augmented reality procedure. In this context, FIG. 6 is a flow chart that illustrates another exemplary embodiment of an initialization process 600 that may be performed in conjunction with a vehicle-based active diagnostic communication process. Certain aspects of the process 600 are similar or identical to those described previously for the process 500. For the sake of brevity and clarity, common aspects and features will not be redundantly described in detail here.

The process 600 may begin by establishing data communication between the mobile user device 104 and the vehicle 102 (task 602). In accordance with this particular embodiment, the camera 208 of the mobile user device 104 is used to capture image content to be used for purposes of an initial diagnosis, troubleshooting, repair, or the like (task 604). In this context, the image content may include, without limitation: one or more still images; a sequence or series of still images; one or more video segments; or the like. In accordance with an ordinary and expected use case, the user holds and manipulates the mobile user device 104 to capture image(s) and/or video(s) of a potentially problematic component, feature, element, area, part, or subsystem of the vehicle 102.

The captured image content is used to generate a suitably formatted request that is intended for the onboard diagnostics subsystem 110 (task 606). In certain embodiments, the augmented reality application resident at the mobile user device 104 is capable of analyzing the captured image content to identify the subject matter conveyed in the image data. In this way, the request may represent a diagnostic check request that is based on the captured image(s) and/or the captured video(s). The request preferably identifies the captured subject matter in a format that can be understood by the onboard diagnostics subsystem 110. The process 600 continues by communicating the diagnostic check request from the mobile user device 104 to the onboard diagnostics subsystem 110 (task 608). In certain embodiments, the request is communicated using the same data communication link established at task 602.

This example assumes that the request is successfully received and interpreted by the onboard diagnostics subsystem 110. Accordingly, the request serves as a triggering mechanism to initiate the self-diagnosis carried out by the onboard diagnostics subsystem 110. Thus, the process 600 continues by performing the necessary self-diagnosis in a manner that is responsive to, and influenced by, the diagnostic check request (task 610). Notably, the onboard diagnostics subsystem 110 may be configured to only perform checks that relate to, involve, or are otherwise associated with the subject matter of the image content. Alternatively or additionally, the onboard diagnostics subsystem 110 may perform a complete self-diagnosis of the vehicle 102, but only provide results that relate to, involve, or are otherwise associated with the subject matter conveyed in the image data. The process 600 may continue by providing the self-diagnostic information to the mobile user device (task 612) and by providing vehicle configuration data to the mobile user device (task 614), as described above for the process 500.

Optional or Alternative Features

As described above, exemplary embodiments leverage a cloud-based solution database system 106 that can be updated and managed as needed to support any number of different vehicle configurations, any amount of solution data, and any number of different end users. In certain implementations, however, the cloud-based solution database system 106 may be optional. In such implementations, the solution database system 106 may be resident at the mobile user device 104. Consequently, the mobile user device 104 can access and search its own solution database system 106 to obtain relevant solution data. If the locally retrieved solution data is insufficient or lacking in some way, then the system can generate and send a query to a cloud-based solution database system 106 in the manner described above.

In accordance with another optional embodiment, the solution database system 106 is implemented in an external "stand alone" computing device or diagnostic system that is distinct and separate from the mobile user device 104 and the vehicle 102. For example, an external system (e.g., a laptop computer) with a solution database system 106 could be connected to the mobile user device 104 or the vehicle 102 as needed to support the augmented reality methodologies described here. If the solution database system 106 is resident at the mobile user device 104 or at an external device or system, then updates and enhancements to the solution data can be installed at appropriate times to ensure that the solution database system 106 contains the most recent information.

In accordance with another optional feature, the mobile user device 104 and its augmented reality application can be used to demonstrate features, functions, and/or operations of the vehicle 102. This optional feature is particularly desirable to demonstrate features, functions, and operations that are usually hidden from view or that would otherwise be difficult or impossible to demonstrate in the real world. For example, the user could take a picture of the dashboard of the vehicle 102 and then ask for a demonstration of the different warning indicators. In response to the picture and the request, the mobile user device 104 initiates an augmented reality procedure to visually simulate what the user will see when the warning indicators are actually triggered. As another example, an augmented reality procedure could be designed to virtually illustrate deployment of an airbag. These and other practical scenarios could be contemplated by the system described here.

In accordance with yet another optional feature, the mobile user device 104 and its augmented reality application can be used as a virtual user's manual and/or as a "how-to" educational system. For example, the user could take a picture or a video of a component, system, or region of the vehicle 102 and then ask for documentation related to the captured image content. In response to the request, the mobile user device 104 may display a list of potentially relevant topics that correspond to the captured image data. The user can then select one of the listed topics to launch a corresponding augmented reality procedure that virtually demonstrates or explains the subject matter of interest. For example, the user might take a picture of the entertainment system's control panel and ask for assistance. In response, the mobile user device 104 initiates an augmented reality procedure that walks the user through the different features and operations related to the entertainment system. The augmented reality procedure may be interactive to allow the user to ask specific questions, retrieve more details related to certain features, or the like. These and other practical scenarios could be contemplated by the system described here.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A diagnostic communication method for a vehicle comprising an onboard diagnostics subsystem, the method comprising:
    obtaining, with a mobile user device comprising a camera and a display element, self diagnostic information generated by the onboard diagnostics subsystem of the vehicle;
    sending a query to a solution database system, the query comprising the obtained self diagnostic information and vehicle configuration data descriptive of the vehicle;
    receiving solution data at the mobile user device, the solution data provided by the solution database system in response to the query, and the solution data addressing at least one topic associated with the obtained self diagnostic information; and
    operating the camera and the display element of the mobile user device in response to the received solution data to perform an augmented reality procedure associated with the at least one topic, wherein, during the augmented reality procedure, the camera captures real time image data of an object of interest on the vehicle, the display element renders the captured real time image data, and the mobile user device concurrently renders supplemental audio, visual, or haptic feedback information corresponding to the received solution data.

2. The method of claim 1, wherein the sending comprises:
    sending the query from the mobile user device to the solution database system.

3. The method of claim 1, wherein the sending comprises:
    sending the query from an onboard communication subsystem of the vehicle to the solution database system.

4. The method of claim 1, wherein the sending comprises:
    sending the query to a network-based solution database system that is remotely located relative to both the vehicle and the mobile user device.

5. The method of claim 1, wherein the sending comprises:
    sending the query to a locally maintained solution database system that is resident at the mobile user device.

6. The method of claim 1, wherein the sending comprises:
    sending the query to an onboard solution database system that is resident at the vehicle.

7. The method of claim 1, wherein the sending comprises:
    sending the query to an external computing device that comprises the solution database system, wherein the external computing device is communicatively coupled to the mobile user device to receive the query.

8. The method of claim 1, wherein the sending comprises:
    sending the query to an external computing device that comprises the solution database system, wherein the external computing device is communicatively coupled to an onboard communication subsystem of the vehicle to receive the query.

9. The method of claim 1, further comprising:
    communicating the self-diagnostic information and the vehicle configuration data from an onboard communication subsystem of the vehicle to the solution database system.

10. The method of claim 1, further comprising:
    acquiring, at the mobile user device, user feedback related to quality of the augmented reality procedure; and
    communicating the user feedback from the mobile user device to the solution database system for use in updating the solution database system.

11. The method of claim 1, further comprising:
    capturing, with the camera of the mobile user device, an image of a potentially problematic component, feature, or element of the vehicle;
    generating a diagnostic check request based on the captured image; and
    communicating the diagnostic check request from the mobile user device to the onboard diagnostics subsystem, wherein the self diagnostic information is generated by the onboard diagnostics subsystem in response to the diagnostic check request.

12. A computer readable storage media comprising executable instructions capable of performing a method comprising:
    obtaining self diagnostic information generated by an onboard diagnostics subsystem of a vehicle;
    sending a query to a solution database system, the query comprising the obtained self diagnostic information and vehicle configuration data descriptive of the vehicle;
    receiving solution data, the solution data provided by the solution database system in response to the query, and the solution data addressing at least one topic associated with the obtained self diagnostic information; and
    operating a camera and a display element of a mobile user device in response to the received solution data to perform an augmented reality procedure associated with the at least one topic, wherein, during the augmented reality procedure, the camera captures real time image data of an object of interest on the vehicle, the display element renders the captured real time image data, and the mobile user device concurrently renders supplemental audio, visual, or haptic feedback information corresponding to the received solution data.

13. The computer readable storage media of claim 12, wherein the method performed by the executable instructions further comprises:
    acquiring user feedback related to quality of the augmented procedure; and
    communicating the user feedback to the solution database system for use in updating the solution database system.

14. The computer readable storage media of claim 12, wherein the method performed by the executable instructions further comprises:
    capturing, with the camera of the mobile user device, an image of a potentially problematic component, feature, or element of the vehicle;
    generating a diagnostic check request based on the captured image; and
    communicating the diagnostic check request from the mobile user device to the onboard diagnostics subsystem, wherein the self diagnostic information is generated by the onboard diagnostics subsystem in response to the diagnostic check request.

15. A diagnostic communication method for a vehicle comprising an onboard diagnostics subsystem, the method comprising:

obtaining, with a mobile user device comprising a camera and a display element, self diagnostic information generated by the onboard diagnostics subsystem and vehicle configuration data descriptive of the vehicle;

retrieving initial solution data based on the obtained self diagnostic information and the obtained vehicle configuration data, the solution data addressing at least one topic associated with the obtained diagnostic information; and operating the camera and the display element of the mobile user device in response to the retrieved initial solution data to perform an initial augmented reality procedure associated with the at least one topic, wherein, during the initial augmented reality procedure, the camera captures real time image data of an object of interest on the vehicle, the display element renders the captured real time image data, and the mobile user device concurrently renders supplemental audio, visual, or haptic feedback information corresponding to the received solution data.

16. The method of claim 15, wherein the retrieving comprises:

retrieving the initial solution data from a locally maintained solution database system that is resident at the mobile user device.

17. The method of claim 15, wherein the retrieving comprises:

retrieving the initial solution data from a network-based solution database system that is remotely located relative to both the vehicle and the mobile user device.

18. The method of claim 15, further comprising:

sending a query to a network-based solution database system that is remotely located relative to both the vehicle and the mobile user device, the query comprising the obtained self diagnostic information and the vehicle configuration data;

receiving additional solution data at the mobile user device, the additional solution data provided by the network-based solution database system in response to the query, and the additional solution data addressing the at least one topic associated with the obtained self diagnostic information; and operating the camera and the display element in response to the received additional solution data to perform an additional augmented reality procedure associated with the at least one topic.

19. The method of claim 15, further comprising:

acquiring, at the mobile user device, user feedback related to quality of the initial augmented reality procedure, the additional augmented reality procedure, or both the initial augmented reality procedure and the additional augmented reality procedure; and communicating the user feedback from the mobile user device to the solution database system for use in updating the solution database system.

20. The method of claim 15, further comprising:

capturing, with the camera of the mobile user device, an image of a potentially problematic component, feature, or element of the vehicle;

generating a diagnostic check request based on the captured image; and communicating the diagnostic check request from the mobile user device to the onboard diagnostics subsystem, wherein the self diagnostic information is generated by the onboard diagnostics subsystem in response to the diagnostic check request.

* * * * *